Patented July 23, 1940

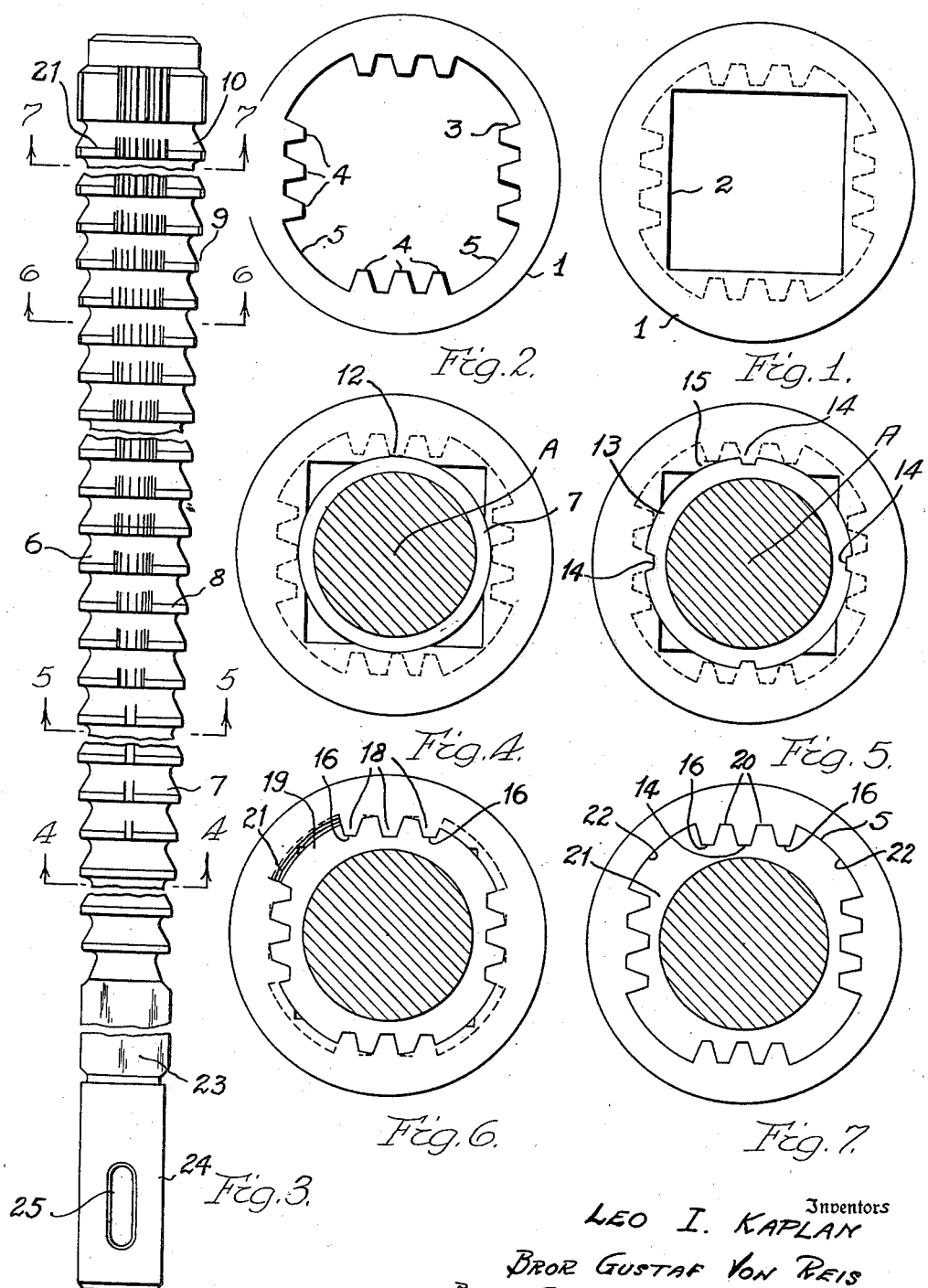

2,209,025

UNITED STATES PATENT OFFICE 2,209,025

BROACH

Leo I. Kaplan and Bror Gustaf von Reis, Detroit, Mich., assignors to Detroit Broach Company, Detroit, Mich., a corporation of Michigan Application March 14, 1938, Serial No. 195,673

8 Claims. (Cl. 29—95.1)

This invention relates to broaches and has for its object to provide a male tool of this type capable of cutting groups of internal splines in a shaft receiving member, the groups being spaced from each other, and to cut bearing surfaces in the spaces, the tool performing both roughing and finishing cuts in a single operation.

Another object is to provide a broach having a plurality of stages or sets of cutters, the stages being progressively responsible for the formation of internal splined teeth surfaces, the teeth themselves and bearing surfaces of substantially greater width than the width of the teeth.

Another object is to provide a broach having cutters adapted to cut surfaces of different shapes and areas, to complete a portion of the cuts prior to other portions, then to complete the remaining cuts with cutters circumferentially balanced so that the broach does not distort axially. During the final cut, in the present instance, the cutters are forming shaft bearing surfaces being relieved of all other duties.

More particularly it is an object to provide a broach capable of generating a successive series of surfaces beginning with an original rectangle and progressing, by means of arcuate cuts, through spline forming stages and bearing forming stages, the contour of the final cut having the form of a rectangle with rounded corners.

Other objects and advantages will become more fully apparent as reference is had to the accompanying drawing wherein our invention is illustrated, and in which:

Fig. 1 is an end view of a work piece showing the starting hole,

Fig. 2 is an end view of the work piece of Fig. 1 showing the finished hole,

Fig. 3 is a side elevation of our improved broach, showing the several cutter stages, Figs. 4, 5, 6 and 7 are diametric transverse sections taken along the lines 4—4, 5—5, 6—6 and 7—7, respectively, of Fig. 3.

More particularly, 1 indicates a more or less elongated main member of suitable exterior shape having a rectangular opening 2, originally formed therein as by forging, extruding or any other suitable method and then machined for the purpose of centering. The problem is to expand or enlarge the opening 2 into a final shape 3, this final shape comprising groups 4 of internal splines separated by bearing surfaces 5.

The tool or broach 6 for cutting this formation is composed of a plurality of groups 7, 8, 9 and 10 of cutters, the cutters of each group being exactly or substantially similar to others in the same group but of progressively larger diameter from front to rear of the tool. The groups differ, each representing a stage in the development of the final form 3.

The first stage 7, as illustrated in Fig. 4, is composed of peripherally unbroken circular cutters, the first of which is slightly larger than possible to form tangents to the four sides of the rectangle so that it takes a shallow arcuate cut from each side thereof. The succeeding cutters enlarge the first arcuate cuts until they have attained a radius having a length from the center A to the points 12 where the first teeth formations are to be started.

The second stage 8, illustrated in Fig. 5, is the forming stage for the single teeth nearest the center A and is composed of a series of cutters 13, each of which has four notches 14 interrupting the periphery thereof. The cutters in the series progressively increase in diameter, the groove bottoms in each case remaining at the same distance from the center A so that the apparent depth of the grooves increases from cutter to cutter until the cutters arrive at the circumference 15, whereupon the next stage 9 of cutters begins.

In this stage 9, as illustrated in Fig. 6, other grooves 16 begin to appear, one on each side of the groove 14, and then apparently grow deeper as the cutters 17 progressively increase in diameter. These grooves 14 and 16 complete the cutting of the spline teeth 18 and the intervening cutting arcs 19 begin cutting the formation of the bearing surfaces. As the teeth 18 are completed the top surfaces 20 of that portion of the cutters between the grooves 14 and 16 become flattened and do not participate further in cutting.

Thereafter the cutting is carried on by the stage 10, which is composed of cutters 21 having equally spaced arcuate cutting surfaces 22. The radius of these arcuate surfaces gradually increases from cutter to cutter until a diameter is attained sufficient to complete the formation of bearing surfaces 5.

The rectangular or square starting hole 2 may be formed by a number of different methods as, for instance, by a starting broach, which is not shown since its type is well known in the art. The starting broach has the function of accurately forming and accurately centering this starting hole. In order that the broach herein revealed may obtain an accurate start therethrough, we provide an accurately formed rectangular or square guide portion 23 integral with the broach, as described, which closely fits this hole 2 and which directs the first circular cutter centrally thereof.

A machine attaching end 24 having a slot 25 is added. The broach may be either pulled or pushed through the work, either in a horizontal or vertical type of machine.

What is claimed is:

1. A broach comprising a plurality of groups of cutters arranged to form a multiplicity of spline grooves, the cutters of each of said groups progressively increasing in size, the cutters in any group being of similar contour to others in its group and differing in contour from the cutters in the remaining groups, said groups gradually altering their form from circular to polygonal with the incipient sides of the polygon being substantially parallel from cutter to cutter.

2. A broach comprising a plurality of groups of cutters, the cutters of each of said groups progressively increasing in size, the cutters in any group being of similar contour to others in its group and differing in contour from the cutters in the remaining groups, said groups gradually altering their form from circular to polygonal with the incipient sides of the polygon being substantially parallel from cutter to cutter, the corners of said polygon being arcuate.

3. A broach comprising a plurality of groups of cutters, the cutters of each of said groups progressively increasing in size, the cutters in any group being of similar contour to others in its group and differing in contour from those of the other of said groups, said groups gradually altering their form from circular to polygonal with the incipient sides of the polygon being substantially parallel from cutter to cutter, the corners of said polygon being arcuate, and the polygonal sides of the largest of said groups each having spline forming teeth formed therein some of which are of progressively increasing depth from cutter to cutter in said group and the remainder of which are of substantially constant depth from cutter to cutter in said group.

4. A broach comprising a plurality of groups of cutters, the cutters of each of said groups progressively increasing in size, the cutters in any group being of similar contour to others in its group and differing in contour from the cutters of the remaining groups, said groups gradually altering their form from circular to polygonal with the incipient sides of the polygon being substantially parallel from cutter to cutter, the corners of said polygon being arcuate, and the sides of the largest of said groups each having spline forming teeth formed therein, the outer surfaces of the teeth of any side of the polygon being flat and residing in the same plane with the outer surfaces of adjacent teeth.

5. A broach comprising a plurality of groups of cutters, the cutters of each of said groups progressively increasing in size, the cutters in any group being of similar contour to others in its group and differing in contour from the cutters of the remaining groups, said groups gradually altering their form from circular to polygonal with the incipient sides of the polygon being substantially parallel from cutter to cutter, the corners of said polygon being arcuate, and the sides of the largest of said groups each having spline forming cutters formed therein of progressively increasing depth from cutter to cutter in said group, said arcuate corners of the largest of said cutters each having a radius greater than the distance from the outermost point of any of said cutters to the center of said polygon.

6. A broach comprising a plurality of groups of cutters, the cutters of each of said groups progressively increasing in size, each cutter in any group being of similar contour to others in its group and differing in contour from those of the remaining groups, said groups gradually altering their form from circular to generally rectangular with arcuate corners, the cutting edges of the first of said groups being circular, the cutting edges of the second of said groups being circular with four equally spaced grooves deleted therefrom, the cutting edges of the third of said groups being circular with equally spaced grooves formed therein, the outermost surfaces separating said grooves changing within said third group from arcuate to flat and coplanar, the cutting surfaces of said last group comprising equally spaced arcs in progressive enlargement of the spaces separating said groups of grooves.

7. A broach comprising a plurality of groups of cutters, the cutters of the first of said groups being circular, said cutters increasing in overall diameter from cutter to cutter and from group to group, the cutters of one of said groups having their peripheries interrupted at intervals by group countershapes of splines, the cutters of another of said groups having spaced arcuate cutting surfaces of greater radius than the overall radius of said countershapes measured from the broach center, said arcuate surfaces corresponding in angular position to said intervals between the countershapes of splines.

8. A broach for a square opening which consists of an accurately formed square guide and centering portion of slightly less size that of said opening, a group of parallel circular cutters, the first of which has a diameter slightly larger than the length of any side of said opening with the subsequent cutters of said group having progressively larger diameters and subsequent groups of cutters progressively increasing in diameter through restricted portions becoming flat at their midsection and progressively increasing the length.

LEO I. KAPLAN.
BROR GUSTAF VON REIS.